US009196260B1

(12) United States Patent
Bentley et al.

(10) Patent No.: US 9,196,260 B1
(45) Date of Patent: Nov. 24, 2015

(54) SYSTEM AND METHOD FOR AUTOMATING VOICE CHECKLISTS (75) Inventors: Jon Bentley, New Providence, NJ (US); Anjur Sundaresan Krishnakumar, Princeton, NJ (US); David Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2157 days.

(21) Appl. No.: 12/243,065

(22) Filed: Oct. 1, 2008

(51) Int. Cl.
*G10L 21/00* (2013.01)

(52) U.S. Cl.
CPC ..................................... *G10L 21/00* (2013.01)

(58) Field of Classification Search
USPC .............................................. 704/270.1, 275
See application file for complete search history.

(56) References Cited

U.S. PATENT DOCUMENTS

| | | | |
|---|---|---|---|
| 4,970,683 A | 11/1990 | Harshaw et al. | |
| 5,267,147 A | 11/1993 | Harshaw et al. | |
| 6,262,720 B1 | 7/2001 | Jeffrey et al. | |
| 6,961,586 B2* | 11/2005 | Barbosa et al. | 455/556.1 |
| 7,260,453 B2 | 8/2007 | Poier et al. | |
| 7,289,890 B2* | 10/2007 | Mitchell et al. | 701/1 |
| 2001/0030611 A1 | 10/2001 | O'Rourke | |
| 2002/0087319 A1* | 7/2002 | Stephenson | 704/270 |
| 2002/0138269 A1* | 9/2002 | Philley | 704/260 |
| 2003/0006910 A1 | 1/2003 | Dame | |
| 2003/0025682 A1 | 2/2003 | Dame | |
| 2003/0125950 A1* | 7/2003 | Avila et al. | 704/260 |
| 2003/0143981 A1* | 7/2003 | Kortum et al. | 455/414 |
| 2004/0044546 A1* | 3/2004 | Moore | 705/2 |
| 2004/0192329 A1* | 9/2004 | Barbosa et al. | 455/456.1 |
| 2005/0027578 A1 | 2/2005 | Chambers, Jr. et al. | |
| 2005/0075968 A1* | 4/2005 | Apostolides | 705/38 |
| 2006/0184369 A1* | 8/2006 | Levonas | 704/275 |
| 2007/0005412 A1* | 1/2007 | Martinez et al. | 705/8 |
| 2007/0095887 A1* | 5/2007 | Barbosa et al. | 235/375 |
| 2007/0150119 A1* | 6/2007 | Mitchell et al. | 701/1 |
| 2007/0166689 A1 | 7/2007 | Huang et al. | |
| 2007/0174076 A1* | 7/2007 | Kord et al. | 705/1 |
| 2007/0192133 A1* | 8/2007 | Morgan | 705/2 |
| 2007/0213988 A1* | 9/2007 | Hanson | 704/275 |
| 2007/0288128 A1 | 12/2007 | Komer et al. | |
| 2008/0154598 A1* | 6/2008 | Smith | 704/246 |

FOREIGN PATENT DOCUMENTS

| | | | | |
|---|---|---|---|---|
| GB | 2050979 A | * | 1/1981 | ............ B64D 45/00 |
| GB | 2420646 A | | 5/2006 | |
| WO | 03/023766 A3 | | 3/2003 | |

OTHER PUBLICATIONS

Maranzano et al. "Architecture Reviews: Practice and Experience" 2005.*

Hart et al. "Errors and Omissions in Anesthesia: A Pilot Study Using a Pilot's Checklist" 2005.*

(Continued)

*Primary Examiner* — Michael N Opsasnick (57) ABSTRACT

The system and method generate a voice checklist template that contains at least one item. A revised voice checklist is generated from the voice checklist template. A request for input for an item in the revised voice checklist is sent. After receiving a response to the request the revised voice checklist is updated with the response. If the revised voice checklist is not complete, the process repeats until the revised voice checklist is complete. Once the process is complete, the revised voice checklist is stored.

28 Claims, 5 Drawing Sheets

(56) References Cited

OTHER PUBLICATIONS

Hales et al. "Development of medical checklists for improved quality of patient care" Dec. 2007.*

Kimura. Machine translation of JP-2006285360A (translated by jpo online translation).*

* cited by examiner

SYSTEM AND METHOD FOR AUTOMATING VOICE CHECKLISTS

TECHNICAL FIELD

The system and method relate to automated checklist systems, and in particular to voice automated checklist systems.

BACKGROUND

There is an increasing demand for automating checklists to reduce costs, reduce errors, and increase worker in many areas such as healthcare, project management, aviation, equipment installation, and the like. As demand increases, so does the need for increasingly simple solutions that automate checklists. Current solutions provide some capabilities in automating checklists. However, these systems fail to fully integrate the capabilities of voice and accelerometer interaction, leverage the existing telephony infrastructure, provide hands free operation, and provide a complete solution for automating various kinds of checklists.

For example, Patent Application No. 2005/0027578 describes a GUI-based checklist for project management. As the flow of a project is completed, checklist items are associated with events in the project. This solution does not leverage the capabilities of voice/accelerometer interaction, is not based on existing telephony systems, does not provide hands-free operation, and only provides a solution for project management.

U.S. Pat. No. 5,267,147 describes a hand-held device that automates checklists in healthcare environments. Using the handheld device, the user can complete a checklist. The user then places the hand-held device in a cradle. The checklist is then printed out. This solution also fails to provide voice/accelerometer interaction, is not based on existing telephony systems, does not provide hands free operation, and only provides a limited solution for healthcare.

Other systems such as described in U.S. Pat. No. 6,262,720, disclose a system for dealing with non-normal checklists. The system determines which checklists are appropriate based on events such as a fire on an airplane. However, like the previous systems, this solution fails to leverage voice/accelerometer interaction, is not based on existing telephony systems, does not provide hands free operation, and only provides a limited solution for aviation.

SUMMARY

The system and method are directed to solving these and other problems and disadvantages of the prior art. The system and method generate a voice checklist template that contains at least one item. A revised voice checklist is generated from the voice checklist template. A request for input for an item in the revised voice checklist is sent. After receiving a response to the request the revised voice checklist is updated with the response. If the revised voice checklist is not complete, the process repeats until the revised voice checklist is complete. Once the process is complete, the revised voice checklist is stored.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
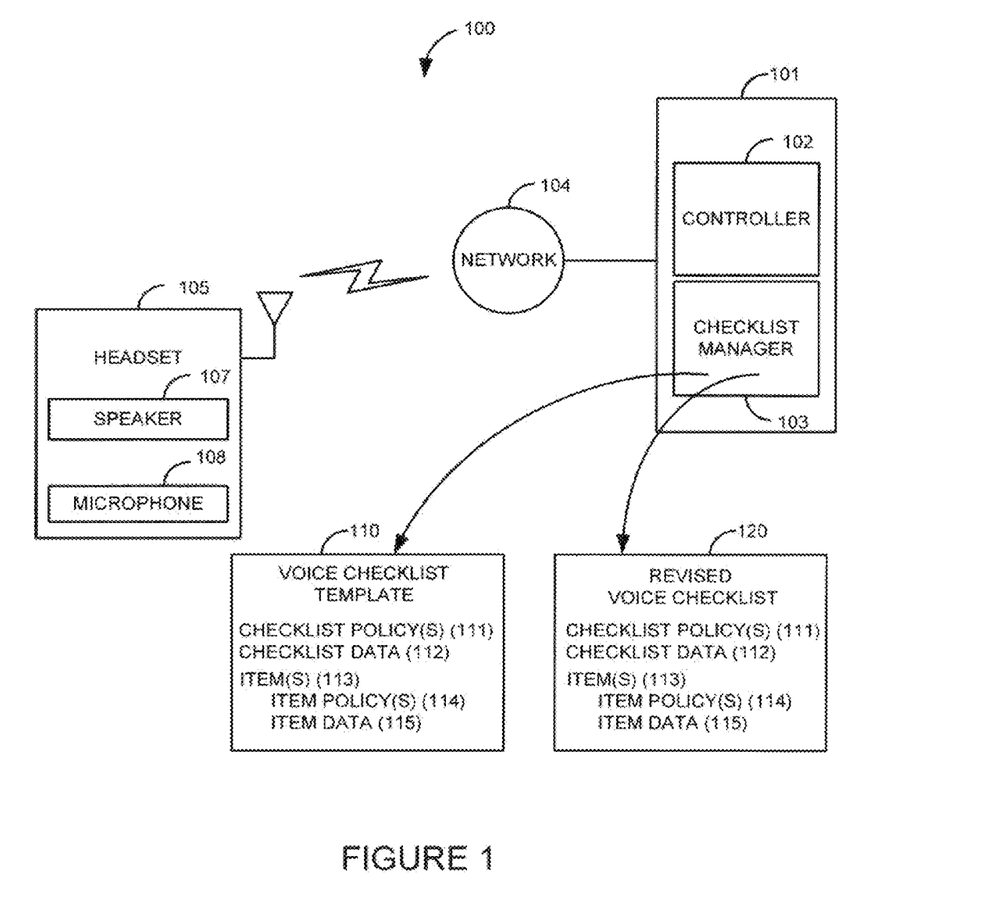
FIG. 1 is a block diagram illustrating a system for automating voice checklists.

FIG. 1 is a block diagram illustrating a first illustrative system 100 for automating voice checklists. The system 100 comprises a checklist system 101, a network 104, and a headset 105. The headset 105 further comprises a speaker 107 and a microphone 108. The microphone 108 is an input device for accepting commands from the user. The speaker 107 is used to convey information to the user of the headset 105. The microphone 108 is used to receive voice responses from the user.

The checklist system 101 further comprises a controller 102 and a checklist manager 103. The checklist system 101 has the capability to convert voice input into text and text to voice messages. The checklist manager 103 manages voice checklist template(s) 110 and revised voice checklist(s) 120. A revised voice checklist 120 is generated based on the voice checklist template 110. Generating a revised voice checklist 120 can be accomplished by copying some or the entire voice checklist template 110. A revised voice checklist 120 is a checklist that is completed through the use of non-visual input such as input from a microphone 108 or an accelerometer 204 (see FIG. 2). The voice checklist templates 110 and revised voice checklists 120 may have one or more checklist policies 111. The voice checklist template(s) 110 and revised voice checklist(s) 120 may have associated checklist data 112. The voice checklist template(s) 110 and revised voice checklist(s) 120 have at least one item 113. The item(s) 113 may have one or more associated item policies 114. The items 113 may have associated item data 115.

The checklist system 101 could be a Private Branch Exchange (PBX), a Personal Computer (PC), a server, an Interactive Voice Response (IVR) system, and/or the like. The network 104 could be a wireless network, a wired network, a fiber optic network, and/or the like. The headset 105 could be any device that contains a speaker 107 and a microphone 108. The headset 105 could be a cellular telephone, a wireless telephone, a Personal Digital Assistant (PDA), a PC, and/or the like. The headset 105 could also comprise the checklist system 101.

A voice checklist template 110 contains at least one item 113 that at allows the user to accomplish a task. For example, a voice checklist template 110 for a nurse starting an IV may contain the following items 113: 1) wash hands with soap, 2) put on sterile gloves, 3) clean the patient's skin with chlorhexidine, 4) place sterile drapes, 5) insert the IV, and 6) place a dressing over the needle. The voice checklist template 110 may have a checklist policy 111. For example, a checklist policy 111 may contain an exception that the user cannot skip any of the items 113 in the voice checklist template 110. The voice checklist template 110 has checklist data 112. An example of checklist data 112 is an indication that the user has completed the revised voice checklist 120 or not. The checklist data 112 could indicate if the user restarted the revised voice checklist 120 before completing the revised voice checklist 120.

An item 113 may also have an associated item policy 114. For example, an item policy 114 may not allow the user to skip a particular item 113. Another example of an item policy 114 could be where an expert must be consulted before completing an item 113. Items 113 have associated item data 115. Item data 115 could indicate if the item 113 has been skipped, completed, not completed, and the like.

A voice checklist template 110 with at least one item 113 is generated by the checklist manager 103. A voice checklist template 110 could be generated by a user interacting with a graphical user interface (GUI), receiving a file (e.g., Extensible Mark up Language (XML) and Voice XML), and/or the like. The user speaks a command to generate a revised voice checklist 120. The request to generate a revised voice checklist 120 is sent to the checklist manager 103. The request to generate the revised voice checklist 120 is received at the checklist manager 103. The checklist manager 103 generates the revised voice checklist 120.

The controller 102 sends a request to the headset 105 for input for one of the items 113 in the revised voice checklist 120. The user provides input for the item 113 in the revised voice checklist 120 through microphone 108. The headset 105 sends a response to the request for input to the controller 102. After receiving the response to the request for input at the controller 102, the controller 102 updates the revised voice checklist 120 with the request for input by updating the item data 115 and/or the checklist data 112.

If the revised voice checklist 120 is not complete (e.g., more items 113 remain), the controller 102 sends a request for input for a second item 113 in the revised voice checklist 120, receives a response to the request for input for the second item, updates the revised voice checklist 120, and determines if the item 113 and the revised voice checklist 120 are complete. Otherwise, if the revised voice checklist 120 is complete, the checklist manager 103 stores the revised voice checklist 120.

Figure 2:
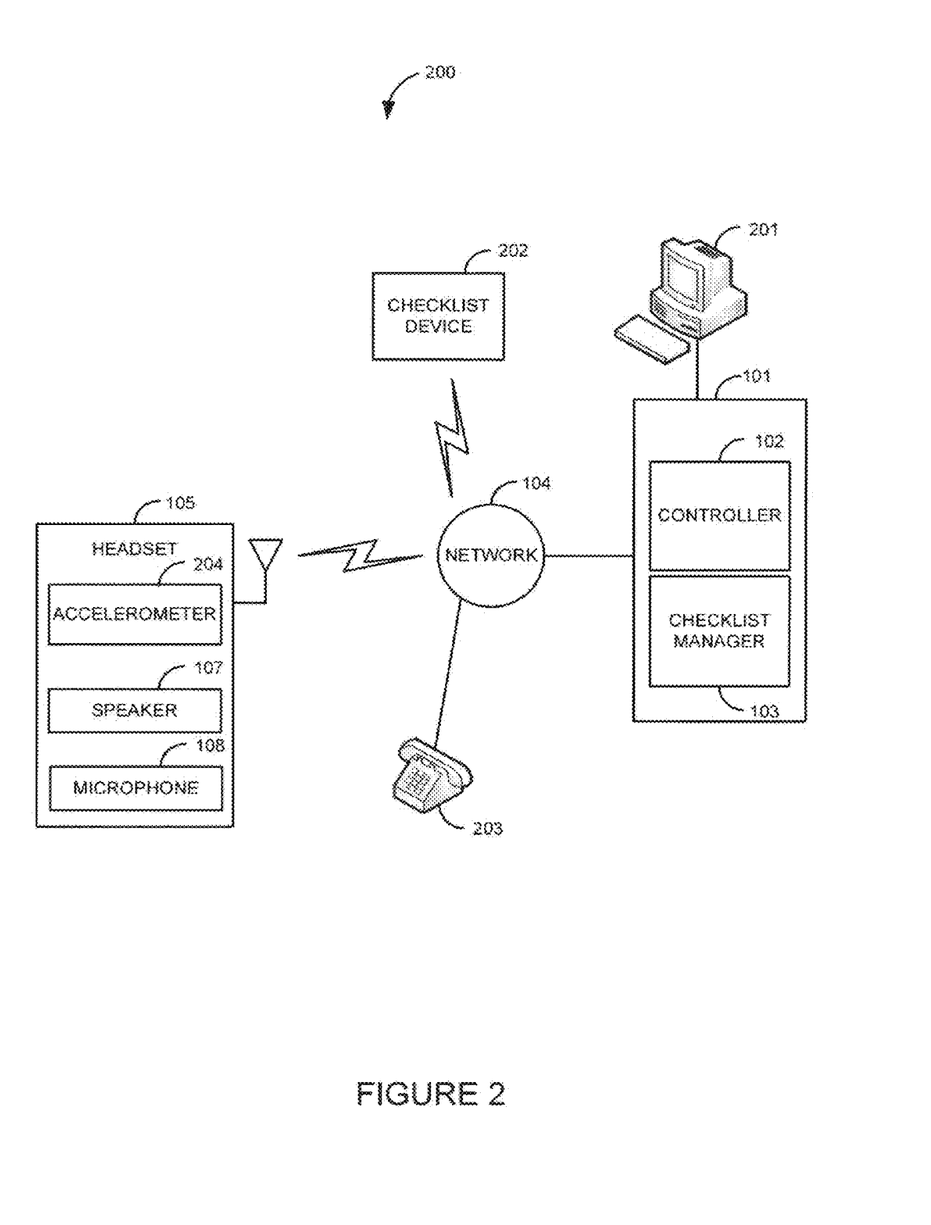
FIG. 2 is a block diagram illustrating a system for automating voice checklists.

FIG. 2 is a block diagram of a second illustrative system 200 for automating voice checklists. The system 200 comprises a checklist system 101, a network 104, a headset 105, a checklist device 202, a Personal Computer 201, and a telephone 203. The headset 105 further comprises a speaker 107, a microphone 108, and an accelerometer 204. The accelerometer 204 is an input device used to accept commands from the user based on gestures (e.g., nodding his/her head yes or shaking his/her head no). The checklist system 101 further comprises a controller 102 and a checklist manager 103. The checklist manager 103 manages voice checklist(s) 110 and revised voice checklist(s) 120.

The PC 201 connects to the checklist system 101. The checklist system 101 connects to the network 104 via a wired connection. The telephone 203 connects to the network 104 via a wired connection. The checklist system 101 and the telephone 203 could connect to the network 104 via a wireless connection based on implementation. The headset 105 connects to the network 104 via a wireless connection. The checklist device 202 connects to the network 104 via a wireless connection.

PC 201 could be any device that allows a user to enter and view information such as a laptop computer, a PDA, a telephone, and the like. For example, the PC could be used to view a web page that generates a voice checklist template 110. The checklist device 202 could be any device that is used in conjunction with a revised voice checklist 120, such as an RFID scanner, a card reader, an EKG machine, an IV drip monitor, and the like. The checklist device 202 could be embedded in the headset. The telephone 203 could be any type of telephone, such as a digital telephone, a SIP phone, an analog phone, and the like.

A user interacts with the PC 201 (e.g., viewing and entering information on a web page). Based on this interaction, the checklist manager 102 generates a voice checklist template 110 with at least one item 113. The user speaks into the microphone 108 and/or motions using the accelerometer 204 a command to generate a revised voice checklist 120 from the voice checklist template 110. The request to generate the revised voice checklist 120 is received at the checklist manager 103. The revised voice checklist 120 is generated by the checklist manager 103.

The controller 102 sends a request to the headset 105 for input for one of the items 113 in the revised voice checklist 120. The user provides input for the item 113 in the revised voice checklist 120 through the microphone 108 and/or the accelerometer 204. The headset 105 sends a response to the request for input to the controller 102. After receiving the response to the request for input at the controller 102, the controller 102 updates the revised voice checklist 120 with the request for input. If the item is not complete, the controller 102 sends a second request for input for the item 113, receives a response to the second request for input for the item 113, updates the revised voice checklist 120, and determines if the item 113 and the revised voice checklist 120 are complete.

If the item 113 is complete and the revised voice checklist 120 is not complete, the controller 102 sends a second request for input for a second item 113 in the revised voice checklist 120, receives a response to the second request for input for the second item 113, updates the revised voice checklist 120, and determines if the item 113 and revised voice checklist 120 are complete. If the item 113 and revised voice checklist 120 are complete, the checklist manager 103 stores the revised voice checklist 120.

The controller 102 determines if an item 113 is complete based on a checklist policy 111 and/or an item policy 114. Each item 113 in the voice checklist template 110 and the revised voice checklist 120 may have various item policies 114 that may require interaction with a checklist device 202 and/or other devices such as the telephone 203. The item policy 114 also defines the requirements to complete an item 113. For example, a policy 113 in the revised voice checklist 120 may require a nurse to scan the barcode on a package of medicine before administering the medicine. The item policy 114 then expects a response from a barcode scanner 202 to complete the item 113. The item policy 114 may determine that the item 113 is not complete if the scanned medicine is not the correct medicine.

As an illustrative example of how the system 200 works, assume, for example, that a generated voice checklist template 110 has the following five items 113: item 1) clean the patient's arm with alcohol, item 2) contact the physician to verify the drug dosage, item 3) administer the drug to the patient, item 4) turn on the EKG machine 202, and item 5) connect the patient to the EKG machine 202. The voice checklist template 110 has a checklist policy 111 that does not allow the nurse to skip any steps. The item policies 114 for steps 1, 3, and 5 require input from the nurse. The item policy 114 for step 2 requires input from a physician. The item policy 114 for step 4 requires input from the EKG machine 202, and potentially from the nurse if the EKG machine 202 is not on.

In this example, the headset 105 is a wireless telephone and the checklist system 101 is an IVR system. After establishing a call to the checklist system 101, the nurse speaks into the wireless telephone 105 the command "drug administration checklist." The wireless telephone 105 sends a request to the checklist manager 103 to generate a revised drug administration checklist 120. In this example, the request to generate the revised drug administration checklist 120 is the recorded voice (e.g., digitized or recorded) of the nurse. The checklist manager 103 receives the request to generate the revised drug administration checklist 120. Once the checklist manager 103 receives the request to generate the drug administration checklist 120, the checklist manager 103 generates the revised drug administration checklist 120 from a drug administration checklist template 110.

The controller 102 sends a request (packetized voice messages) to the wireless telephone 105 for input for the item 1 (clean the patient's arm with alcohol) in the revised drug administration checklist 120. The wireless telephone 105 says to the nurse "clean the patient's arm with alcohol." After cleaning the patient's arm with alcohol, the nurse responds by saying "complete" into the wireless telephone 105. The wireless telephone 105 sends a response (packetized voice of nurse saying "complete") to the request for input indicating that the nurse completed item 1. The controller 102 receives the response to the request for input. The controller 102 updates the revised drug administration checklist 120 item data 115 for item 1 to indicate that the item 1 is compete.

The controller 102 determines that the revised administration checklist 120 is not complete because there are incomplete items 113 (items 1-4) left in the revised administration checklist 120. The controller 102 sends to the wireless telephone 105 a first request for input for item 2 (contact the physician to verify the drug dosage). The wireless telephone 105 says to the nurse "would you like to connect to the physician to verify the drug dosage?" The nurse says "yes." The headset 105 sends a response to the request for input indicating that the nurse said "yes." The controller 102 updates the revised drug administration checklist 120 item data 115 for item 2 to indicate that the nurse wants to connect to a physician. The physician is then called on his/her telephone 203 and conferenced in by the controller 102.

The controller 102 determines that item 2 is not complete because additional input is required from the physician. The controller 102 sends to the wireless telephone 105 a second request for input for item 2 (input from physician). The conferenced-in physician is asked to enter a verification code indicating he/she has verified the dosage. The response to the request for input for item 2 is sent to the controller 102. The controller 102 updates the revised drug administration checklist 120 item data 115 for item 2 indicating the physician's verification code and that item 2 is complete.

The controller 120 determines that item 2 is complete and the revised drug administration checklist 120 is not complete because items 3-5 have not been completed. The controller 102 sends to the wireless telephone 105 a request for input for item 3 (administer the drug to the patient). The wireless telephone 105 says to the nurse "administer the drug to the patient." After administering the drug to the patient, the nurse says "administered 40 milligrams of codeine." The headset 105 sends a response to the request for input for item 3. The controller 102 receives the response to the request for input for item 3. The controller 102 updates the revised drug administration checklist 120 item data 115 to indicate that the nurse administered 40 mg. of codeine and that step 3 is complete.

The controller 102 determines that item 3 is complete and the revised drug administration checklist 120 is not complete (items 4-5 are not complete). The controller 102 sends a request for input for item 4 (turn on the EKG machine) to the EKG machine 202 (based on the item policy 114) to determine if the EKG machine 202 is turned on. If the EKG machine 202 is on, the EKG machine 202 sends a response to the request for input to the controller 102 indicating that the EKG machine 202 is on. The controller 102 updates the revised drug administration checklist 120 item data 115 to indicate that step 4 is complete.

If the EKG machine 202 is not on and the controller 102 does not receive a response to the request for input from the EKG machine 202, and therefore the controller 102 (based on the item policy 114) sends to the wireless telephone 105 a request for input for item 4. The wireless telephone 105 says to the nurse "turn on the EKG machine." The nurse then turns on the EKG machine 202. The nurse then says "complete" into the microphone 108. The response to the request for input for item 4 is sent to the controller 102. The controller 102 sends a request for input for item 4 to the EKG machine 102 to verify that the EKG machine 202 is on. The EKG machine sends a response to the request for input to the controller 102. The controller 102 updates the revised drug administration checklist 110 item data 115 to indicate that the nurse completed step 4.

The controller 102 determines that item 4 is complete and the revised drug administration checklist 120 is not complete (item 5 is not complete). The controller 102 sends a request for input for item 5 (connect the patient to the EKG machine 202). The wireless telephone 105 says to the nurse "connect the patient to the EKG machine." After connecting the patient to the EKG machine 202, the nurse says "complete." The wireless telephone 105 sends a response to the request for input for item 5. The controller 102 updates the revised drug administration checklist 120 item data 115 to indicate that the nurse completed step 5. The controller 102 determines that item 5 and the revised drug administration checklist 120 are complete and directs the checklist manager 103 to store the revised drug administration checklist 120.

Figure 3:
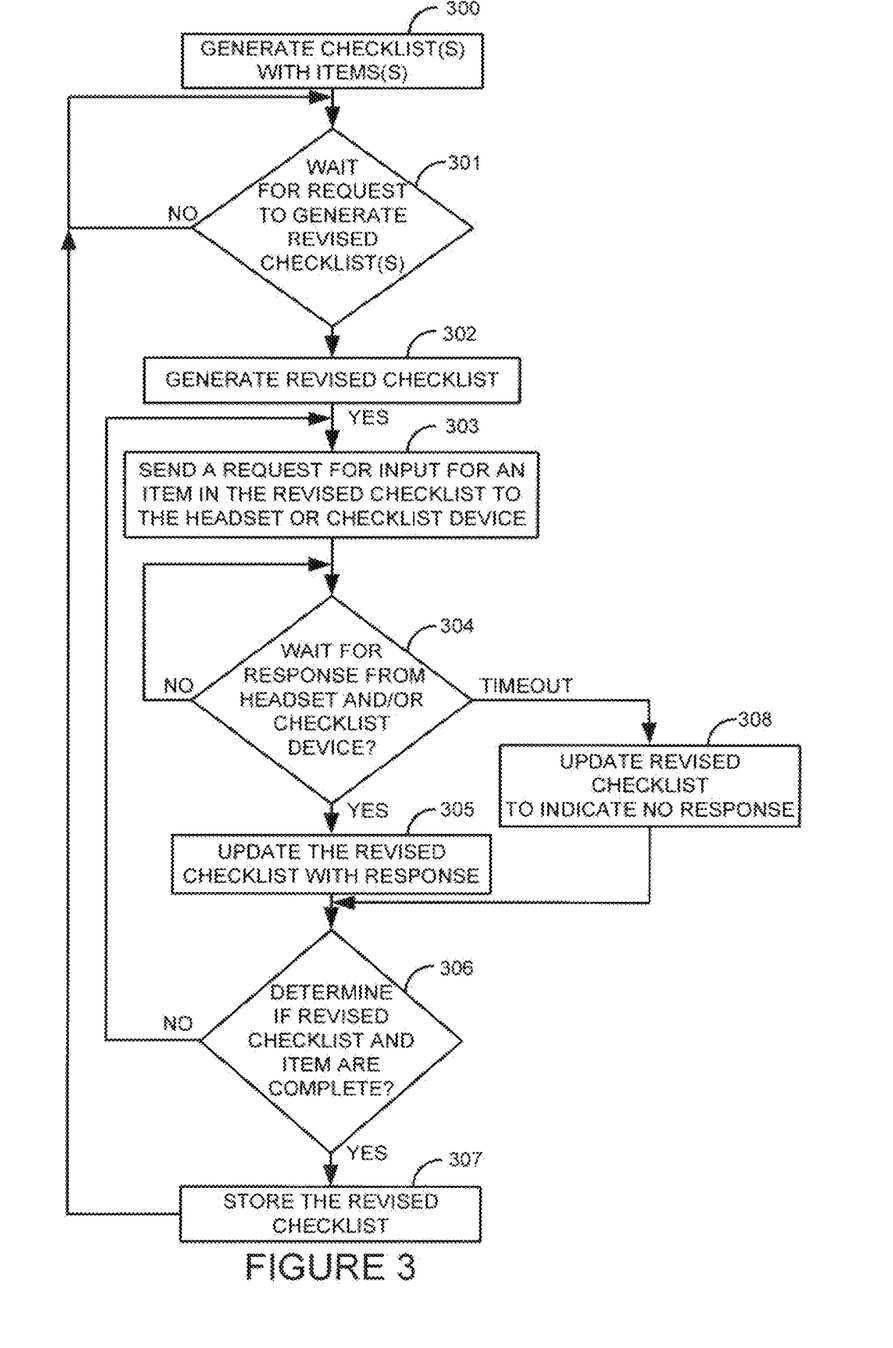
FIG. 3 is a computer-implemented method for generating and automating voice checklists.

FIG. 3 is a computer-implemented method for generating and automating voice checklists 110. Illustratively, the controller 102, the checklist manager 103, and the headset 105 are stored-program-controlled entities, such as computers, which perform the methods of FIGS. 3-4 by executing programs stored in storage media, such as memory or disk. The process starts by the checklist manager 103 generating 300 at least one voice checklist template 110 with at least one item 113. The process of generating 300 at least one voice checklist template 110 can be accomplished in a variety of ways, such as by using a Domain Specific Language (DSL), using a GUI, using VXML, and the like. The process waits 301 to receive a request to generate at least one revised voice checklist 120. Receiving a request to generate at least one revised voice checklist 120 could be receiving a phone call to an IVR system. For example, a user in an emergency could call a telephone number supported by the IVR and be walked through a CPR process using a revised voice checklist 120. Other examples could be where the user says "generate installation checklist" when installing equipment.

Upon receiving a request to generate a revised voice checklist(s) 120, the process generates 302 a revised voice checklist 120 from the voice checklist template 110. The process sends 303 a request for input for an item 113 in the revised voice checklist 120 to the headset 105 and/or the checklist device 202. The step of sending 303 a request for input could also include sending a progress indicator. A progress indicator could be, for example, telling the user that he/she is on step 5 of 20 in the revised voice checklist 120. Other examples could include giving a percentage of the revised voice checklist 120 that is complete and/or notifying the user of how many seconds are left to complete the revised voice checklist 120. The process waits 304 to receive a response to the request for input sent in step 303. If a response to the request for input is received, the process updates 305 the revised voice checklist 120 with the response for input. If no response is received and the process times-out in step 304, the process updates 308 the revised voice checklist 120 to indicate no response was received.

The process determines 306 if the revised voice checklist 120 and the item 113 are complete. The process could determine 306 that a revised voice checklist 120 is complete for a variety of reasons. For example, a revised voice checklist 120 is complete when all the items 113 in the revised voice checklist 120 have been completed. Another example is when a revised voice checklist 120 has been canceled. An item 113 may not be complete if the checklist policy 111 and/or the item policy 114 require further interaction from the headset 105 (user) and/or the checklist device 202. For example, the user could respond to the request for input on an item 113 by saying "skip the item." The checklist policy 111 and/or the item policy 114 may not allow the item 113 to be skipped. In this example, the process would determine 306 that the item 113 is not complete because the user tried to skip a step that cannot be skipped. If the process determines 306 that the revised voice checklist 120 and/or the item 113 are not complete, the process goes to step 303. Otherwise, the process stores 307 the revised voice checklist 120. The process then waits 301 for a request to generate a revised voice checklist 120.

Figure 4:
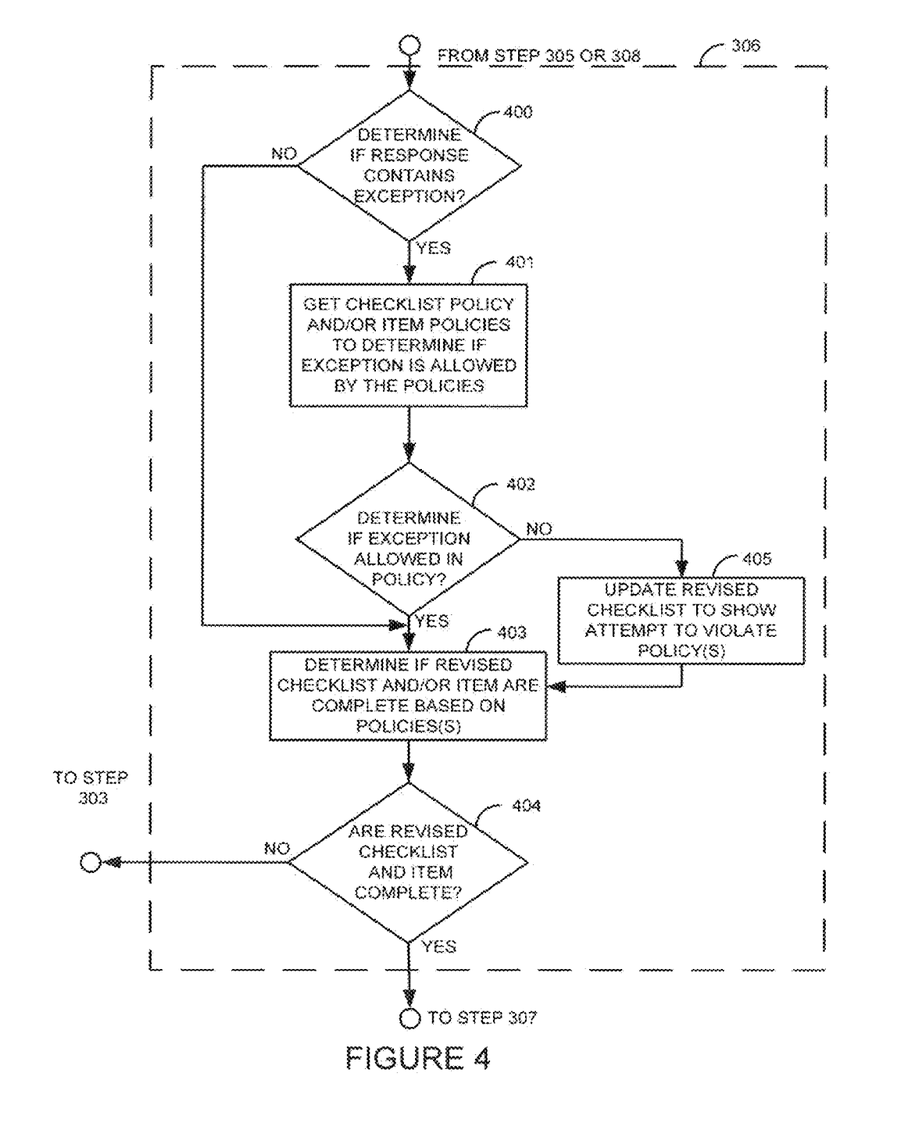
FIG. 4 is a computer-implemented method for handling exceptions and policies in conjunction with voice checklists.

FIG. 4 is a computer-implemented method for handling exceptions and policies in conjunction with voice checklists. FIG. 4 is an expanded view of step 306 in FIG. 3. The process determines 400 if the received response for input contains an exception. Examples of exceptions could be skipping a step, canceling the revised voice checklist 120, saying the step is not necessary, and the like. If the response did not contain an exception or if there was no response from step 304 (timeout), the process goes to step 403. Otherwise, the process gets 401 the checklist policy(ies) 111 and/or the item policy(ies) 114 to determine if the exception is allowed by either policy (111 and/or 114). The process determines 402 if the exception is allowed in the checklist policy 111 and/or the item policy 114. If the exception is not allowed in step 402, the process updates 405 the revised voice checklist 120 to show the attempt to violate one of the policies (111 and/or 114). The process then determines 403 if the revised voice checklist 120 and/or the item 113 are complete based on the policies (111 and/or 114).

Otherwise, if the process determines 402 that the exceptions are allowed in the policy (111 and/or 114), the process determines 403 if the revised voice checklist 120 and/or the item 113 are complete based on the policies (111 and/or 114). If the revised voice checklist 120 and item 113 are complete in step 404, the process goes to step 307. Otherwise, the process goes to step 303.

Figure 5:
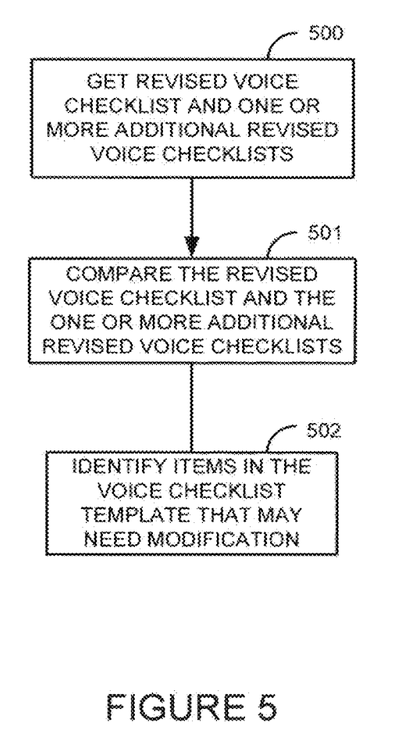
FIG. 5 is a computer-implemented method for comparing revised voice checklists.

FIG. 5 is a computer-implemented method for comparing revised voice checklists 120. The process gets 500 the revised voice checklist 120 and one or more additional revised voice checklists 120. For example, each time a maintenance technician completes a revised voice checklist 120, the revised voice checklist 120 is stored. As multiple maintenance technicians complete additional revised voice checklists 120, the additional revised voice checklists 102 are stored. The revised voice checklist 120 is compared 501 to the additional revised voice checklists. The process identifies 502 items 113 in the voice checklist template 110 that may need modification. For example, if the same item 113 in the revised voice checklist 120 is skipped every time, then the voice checklist template may need to be modified to remove the item 113 from the voice checklist template 110.

Of course, various changes and modifications to the illustrative embodiment described above will be apparent to those skilled in the art. For example, items 113 in a voice checklist template 110 could include taking a picture from a picture phone to show you have completed an item 113, receiving pictures in a cell phone to show how to complete an item, asking for help for an item, and various other types of multimedia. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A non-transitory computer readable medium having program instructions stored thereon for automating voice checklists, the program instructions comprising:

a. a checklist manager configured to generate at least one voice checklist template, to generate a revised voice checklist from the voice checklist template, and to store the revised voice checklist; and     b. a controller configured to send a request for input for an item in the revised voice checklist to a first device, to receive a response to the request for input from the first device wherein the response indicates a command, to send a request for verification of the command to a second device, to receive verification of the command from the second device, to update the revised voice checklist based on the verification, to determine if the revised voice checklist is complete, to send a request for input for a second item in the revised voice checklist to the first device in response to determining that the revised voice checklist is not complete, and to direct the checklist manager to store the revised voice checklist in response to determining that the revised voice checklist is complete.

2. The computer readable medium of claim 1, wherein the response to the request for input is generated in an input device selected from the group comprising: a microphone, a button, a key, and an accelerometer.

3. The computer readable medium of claim 1, wherein the checklist manager is configured to generate the voice checklist template using a Domain Specific Language.

4. The computer readable medium of claim 1, wherein the checklist manager is configured to compare the revised voice checklist with one or more additional revised voice checklists, to analyze the revised voice checklist in relation to the one or more additional revised voice checklists, and to identify an item in the voice checklist template that needs to be modified.

5. The computer readable medium of claim 1, wherein the command indicates whether the item has been completed or has not yet been completed.

6. The computer readable medium of claim 1, wherein the first device comprises a headset and the second device comprises a checklist device.

7. The computer readable medium of claim 1, wherein the controller is configured to send a progress indicator.

8. The computer readable medium of claim 1, wherein the response to the request for input contains at least one exception selected from the group comprising: a request to skip the item, an indication that the item is not necessary, an indication that help is needed, an indication that the item is wrong, adding comments, and a request to reactivate the revised voice checklist.

9. The computer readable medium of claim 1, wherein the item has an item policy.

10. The computer readable medium of claim 9, wherein the item policy is at least one item selected from the group comprising: sending a notification, calling a person, noting an exception, not allowing an exception, and querying a checklist device.

11. The computer readable medium of claim 1, wherein the voice checklist template has a checklist policy.

12. The computer readable medium of claim 1, wherein the revised voice checklist is generated upon receipt of a call.

13. The computer readable medium of claim 1, wherein the controller is configured to determine if an item is complete.

14. A computer-implemented method for automating voice checklists, comprising:

in a computer system:
  a. generating at least one voice checklist template, wherein the voice checklist template contains at least one item;
  b. generating a revised voice checklist from the voice checklist template;
  c. sending a request for input to a first device for one of the items in the revised voice checklist;
  d. receiving a response to the request for input from the first device wherein the response indicates a command;
  e. sending a request for verification of the command to a second device;
  f. receiving verification of the command from the second device;
  g. updating the revised voice checklist based on the verification;
  h. determining if the revised voice checklist is complete;
  i. responsive to the revised voice checklist not being complete, going to step (c); and
  j. responsive to the revised voice checklist being complete, storing the revised voice checklist.

15. The method of claim 14, wherein the response to the request for input is generated in an input device selected from the group comprising: a microphone, a button, a key, and an accelerometer.

16. The method of claim 14, wherein generating at least one voice checklist template further comprises the step of: using a Domain Specific Language to generate the voice checklist template.

17. The method of claim 14, further comprising the steps of: comparing the revised voice checklist with one or more additional revised voice checklists, analyzing the revised voice checklist in relation to the one or more additional revised voice checklists, and identifying an item in the voice checklist template that needs to be modified.

18. The method of claim 14, wherein the command indicates whether the item has been completed or has not yet been completed.

19. The method of claim 14, wherein the first device comprises a headset and the second device comprises a checklist device.

20. The method of claim 14, further comprising the step of: sending a progress indicator.

21. The method of claim 14, wherein the response to the request for input contains at least one exception selected from the group comprising: a request to skip the item, an indication that the item is not necessary, an indication that help is needed, an indication that the item is wrong, adding comments, and a request to reactivate the revised checklist.

22. The method of claim 14, wherein the item has an item policy.

23. The method of claim 22, wherein the item policy is at least one item selected from the group comprising: sending a notification, calling a person, noting an exception, not allowing an exception, and querying a checklist device.

24. The method of claim 14, wherein the voice checklist template has a checklist policy.

25. The method of claim 14, wherein the revised voice checklist is generated upon receipt of a call.

26. The method of claim 14, wherein the step of determining if the revised voice checklist is complete further comprises the step of determining if an item is complete.

27. An apparatus for performing the method of one of claims 14-26.

28. An apparatus for automating voice checklists comprising:
  a. means for generating at least one voice checklist template, wherein the voice checklist template contains at least one item;
  b. means for generating a revised voice checklist from the voice checklist template;
  c. means for determining if the revised voice checklist is complete;
  d. means, responsive to the revised voice checklist not being complete, for sending a request for input to a first device for one of the items in the revised voice checklist;
  e. means for receiving a response to the request for input from the first device wherein the response indicates a command;
  f. means for sending a request for verification of the command to a second device;
  g. means for receiving verification of the command from the second device;
  h. means for updating the revised voice checklist based on the verification; and
  i. means, responsive to the revised voice checklist being complete, for storing the revised voice checklist.

* * * * *